US011810333B2

(12) United States Patent
Jiao et al.

(10) Patent No.: US 11,810,333 B2
(45) Date of Patent: Nov. 7, 2023

(54) METHOD AND APPARATUS FOR GENERATING IMAGE OF WEBPAGE CONTENT

(71) Applicant: Baidu Online Network Technology (Beijing) Co., Ltd., Beijing (CN)

(72) Inventors: Yang Jiao, Beijing (CN); Yi Yang, Beijing (CN); Jianguo Wang, Beijing (CN); Yi Li, Beijing (CN); Xiaodong Chen, Beijing (CN); Lin Liu, Beijing (CN); Xiang He, Beijing (CN); Yanfeng Zhu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 336 days.

(21) Appl. No.: 17/207,564

(22) Filed: Mar. 19, 2021

(65) Prior Publication Data

US 2021/0264614 A1 Aug. 26, 2021

(30) Foreign Application Priority Data

Apr. 21, 2020 (CN) .......................... 202010315358.9

(51) Int. Cl.
*G06V 20/62* (2022.01)
*G06T 7/187* (2017.01)
(Continued)

(52) U.S. Cl.
CPC ............ *G06V 20/62* (2022.01); *G06F 16/951* (2019.01); *G06T 7/11* (2017.01); *G06T 7/187* (2017.01);
(Continued)

(58) Field of Classification Search
CPC ............ G06V 20/62; G06V 30/18076; G06V 10/457; G06V 30/10; G06V 30/15;
(Continued)

(56) References Cited

U.S. PATENT DOCUMENTS

2013/0061132 A1 3/2013 Zheng et al.
2013/0283148 A1* 10/2013 Lim ...................... G06F 40/143
715/234
(Continued)

FOREIGN PATENT DOCUMENTS

CN 102567300 A 7/2012
CN 102893277 A 1/2013
(Continued)

OTHER PUBLICATIONS

European Patent Application No. 21163538.8 Extended European Search Report dated Sep. 6, 2021, 6 pages.
(Continued)

*Primary Examiner* — Sumati Lefkowitz
*Assistant Examiner* — Michael Adam Shariff
(74) *Attorney, Agent, or Firm* — Cozen O'Connor

(57) ABSTRACT

A method and an apparatus for generating an image are provided. The method includes: acquiring a screenshot of a webpage preloaded by a terminal as a source image; recognizing connection areas in the source image, and generating first circumscribed rectangular frames outside outlines of the connection areas; combining, in response to determining that a distance between the connection areas is smaller than a preset distance threshold, the connection areas, and generating a second circumscribed rectangular frame outside outlines of the combined connection areas; and generating, based on a nested relationship between the first circumscribed rectangular frames and the second circumscribed rectangular frames and pictures in the first circumscribed rectangular frames, a target image. The first circumscribed rectangular frames and the second circumscribed rectangular frame are respectively generated by recognizing and combining the connection areas in the source image.

15 Claims, 7 Drawing Sheets

(51) Int. Cl.
*G06T 7/11* (2017.01)
*G06F 16/951* (2019.01)
*G06T 11/20* (2006.01)
*G06V 30/148* (2022.01)
*G06V 30/18* (2022.01)
*G06V 30/10* (2022.01)

(52) U.S. Cl.
CPC ............ *G06T 11/203* (2013.01); *G06V 30/15* (2022.01); *G06V 30/18076* (2022.01); *G06V 30/10* (2022.01)

(58) Field of Classification Search
CPC .... G06V 10/751; G06V 30/148; G06V 10/10; G06V 10/26; G06V 30/153; G06V 30/19013; G06V 10/267; G06V 10/40; G06V 10/454; G06V 10/7625; G06V 30/141; G06V 30/18; G06F 18/00; G06F 16/951; G06F 16/95; G06F 16/953; G06F 16/9532; G06F 16/9538; G06F 16/9577; G06F 16/00; G06F 40/137; G06T 7/10; G06T 7/11; G06T 7/12; G06T 7/13; G06T 7/187; G06T 11/203; G06T 11/60; H04N 21/8543

See application file for complete search history.

(56) References Cited

U.S. PATENT DOCUMENTS

2015/0055851 A1 2/2015 Nykyforov
2019/0065589 A1 2/2019 Wen et al.
2020/0057788 A1 2/2020 Huang et al.

FOREIGN PATENT DOCUMENTS

| | | | |
|---|---|---|---|
| CN | 104951741 | A | 9/2015 |
| CN | 107330465 | A | 11/2017 |
| CN | 107748888 | A | 3/2018 |
| CN | 109711508 | A | 5/2019 |
| CN | 109951654 | A | 6/2019 |
| CN | 110555839 | A | 12/2019 |
| EP | 2633432 | A1 | 9/2013 |
| JP | 2013149210 | A | 8/2013 |
| WO | WO 2015139469 | A1 | 9/2015 |
| WO | WO 2019169772 | A1 | 12/2019 |
| WO | WO 2020000879 | A1 | 2/2020 |

OTHER PUBLICATIONS

Japanese Patent Application No. 2021-052215 Notice of Reasons for Refusal dated Jun. 14, 2022, 3 pages.
English translation of Japanese Patent Application No. 2021-052215 Notice of Reasons for Refusal dated Jun. 14, 2022, 3 pages.
Li Yan-Ling et al., "Document Page Segmentation and Classification Based on Pattern-list Analysis" Journal of Image and Graphics, vol. 10 No.6, Jun. 2005, 5 pages.
Kong Qian-Qian et al. "Indoor Window Detection Based on Image Contour Analysis", Jisuanji Yu Xiandaihua, No. 272 Apr. 2018, 6 pages.
Jia Ke-Zhen "Web Page Segmentation Method Based on DOM and Image Processing" 2018, 3 pages.

* cited by examiner

METHOD AND APPARATUS FOR GENERATING IMAGE OF WEBPAGE CONTENT

CROSS-REFERENCE TO RELATED APPLICATIONS

This application claims the priority of Chinese Patent Application No. 202010315358.9, titled "METHOD AND APPARATUS FOR GENERATING IMAGE," filed on Apr. 21, 2020, the content of which is incorporated herein by reference in its entirety.

TECHNICAL FIELD

The present disclosure provides a method and an apparatus for generating an image, relates to the field of computer technology, and in particular, relates to the field of computer vision.

BACKGROUND

Texts and pictures in html (hypertext makeup language) pages often include important information, and are valuable materials. In the related technology, based on a file in an html page, materials to be extracted therein are determined by encoding, and then the file corresponding to the materials to be extracted is downloaded from a server to acquire the materials in the html page.

SUMMARY

Embodiments of the present disclosure provide a method, an apparatus, a device and a storage medium for generating an image.

According to a first aspect, a method for generating an image is provided, and the method includes: acquiring a screenshot of a webpage preloaded by a terminal as a source image; recognizing connection areas in the source image, and generating first circumscribed rectangular frames outside outlines of the connection areas; combining, if a distance between the connection areas is smaller than a preset distance threshold, the connection areas, and generating a second circumscribed rectangular frame outside outlines of the combined connection areas; and generating a target image, based on a nested relationship between the first circumscribed rectangular frames and the second circumscribed rectangular frame, and pictures in the first circumscribed rectangular frame.

According to a second aspect, an apparatus for generating the image is provided, and the apparatus includes: an image acquisition module, configured to acquire a screenshot of a webpage preloaded by a terminal as a source image; a first generation module, configured to recognize connection areas in the source image, and generate first circumscribed rectangular frames outside outlines of the connection areas; a second generation module, configured to combine, if a distance between the connection areas is smaller than a preset distance threshold, the connection areas, and generate a second circumscribed rectangular frame outside outlines of the combined connection areas; and an image generation module, configured to generate a target image, based on a nested relationship between the first circumscribed rectangular frames and the second circumscribed rectangular frame, and pictures in the first circumscribed rectangular frames.

It should be appreciated that the content described in this section is not intended to identify the key or critical features of the embodiments of the present disclosure, nor is it intended to limit the scope of the present disclosure. The other features of the present disclosure will become easy to understand through the following description.

BRIEF DESCRIPTION OF THE DRAWINGS

The accompanying drawings are intended to provide a better understanding of the present disclosure and do not constitute a limitation to the present disclosure.

DETAILED DESCRIPTION OF EMBODIMENTS

Example embodiments of the present disclosure are described below in combination with the accompanying drawings, including various details of the embodiments of the present disclosure to facilitate understanding, and should be considered as examples only. Therefore, those skilled in the art should be aware that various changes and modifications to the embodiments described herein may be made without departing from the scope and spirit of the present disclosure. Similarly, for clarity and conciseness, descriptions of well-know functions and structures are omitted from the following description.

According to the technology of the present disclosure, the problem that the materials extracted from a webpage may not reflect a spatial relationship between materials in the related technology may be solved. The first circumscribed rectangular frames and the second circumscribed rectangular frame are respectively generated by recognizing and combining the connection areas in the source image. The spatial relationship between the materials in the webpage is represented by the nested relationship between the first circumscribed rectangular frames and the second circumscribed rectangular frame, so that the spatial relationship between materials in the source image may be reflected in the generated target image.

Figure 1:
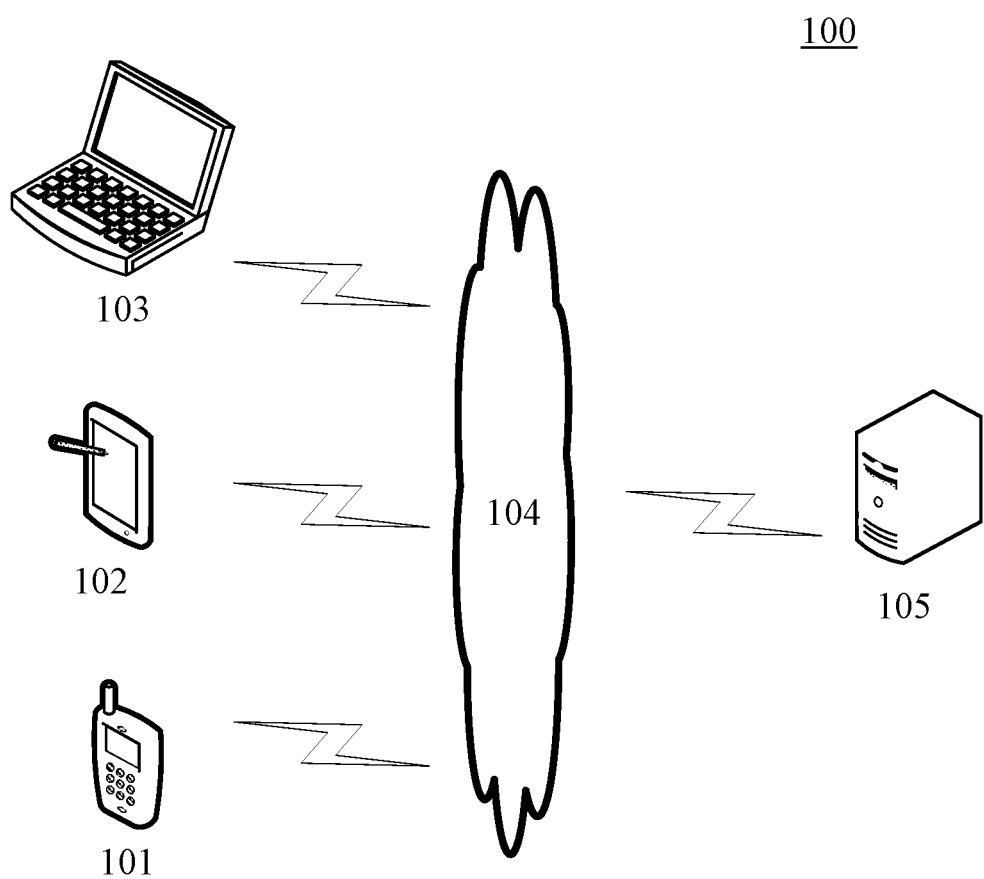
FIG. 1 is an example system architecture diagram in which an embodiment of the present disclosure may be applied.

FIG. 1 shows an example system architecture 100 in which a method for generating an image or an apparatus for generating the image of an embodiment of the present disclosure may be applied.

As shown in FIG. 1, the system architecture 100 may include terminal devices 101, 102 and 103, a network 104 and a server 105. The network 104 serves as a medium for providing a communication link between the terminal devices 101, 102 and 103 and the server 105. The network 104 may include various types of connections, such as wired or wireless communication links, or optical fiber cables.

A user may use the terminal devices 101, 102 and 103 to interact with the server 105 through the network 104 to receive or send messages. For example, the user may input a webpage address that the user wants to browse into a terminal device. The terminal device acquires data from the server 105 through the network 104, and then generates a webpage through steps such as parsing and rendering based on the acquired data, and finally presents the webpage to the user.

The terminal devices 101, 102 and 103 may be hardware or software. When the terminal devices 101, 102, 103 are hardware, the hardware may be various electronic devices having data interaction functions with the server and other terminal devices, including but not limited to a smart phone, a tablet computer and a desktop computer. When the terminal devices 101, 102, 103 are software, the software may be installed in the electronic devices. The software may be implemented, for example, as multiple software pieces or software modules for providing distributed services, or as a single software piece or software module, which is not specifically limited herein.

The server 105 may be a server providing a data processing service, such as transmitting corresponding data to the terminal devices according to an access request sent by the terminal devices 101, 102 and 103, so that the terminal devices may generate a webpage to be accessed.

It should be noted that the method for generating the image provided by the embodiment of the present disclosure may be executed by the server 105, and correspondingly, the apparatus for generating the image may be arranged in the server 105. In this case, the server 105 acquires webpage information preloaded on the terminal devices 101, 102 and 103 through the network 104, and generates a source image according to the acquired webpage information and extracts a material from the source image. The method for generating the image provided by the embodiment of the present disclosure may also be executed by a terminal device, and correspondingly, the apparatus for generating the image may be arranged in the terminal device. In this case, the terminal device communicates with the other terminal devices through the network 104, acquires webpage information preloaded on the other terminal devices, and generates a source image according to the acquired webpage information and extracts a material from the source image, which is not specifically limited herein.

Figure 2A:
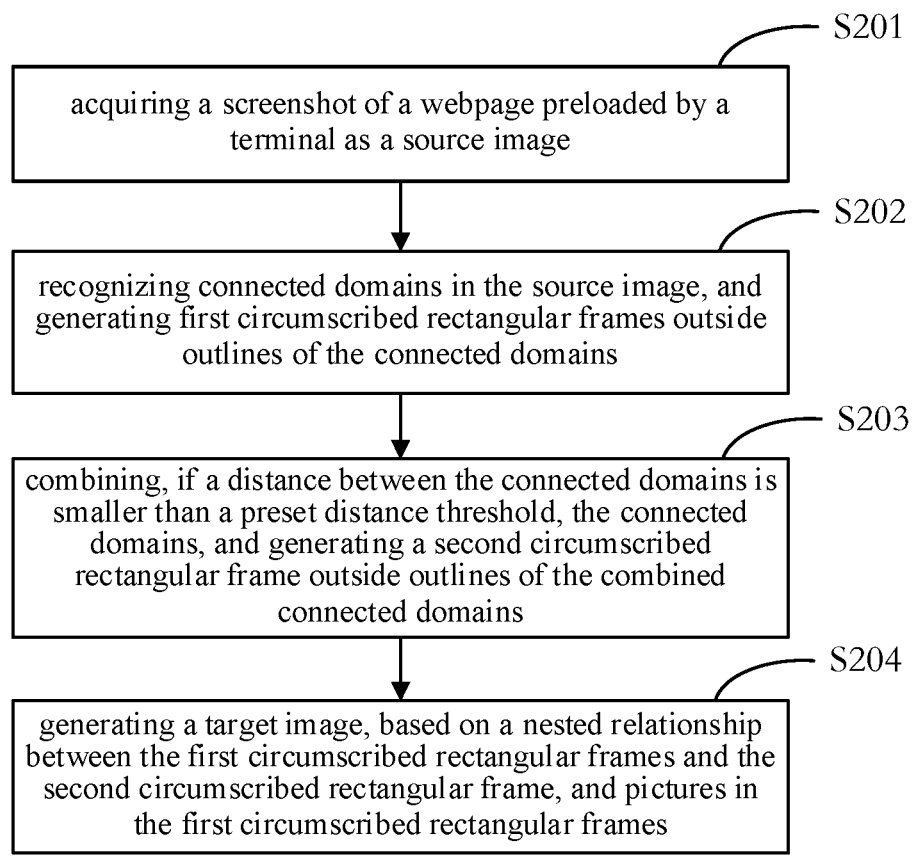
FIG. 2(a)-FIG. 2(b) is a schematic diagram of a first embodiment of a method for generating an image according to an embodiment of the present disclosure.

Further referring to FIG. 2(*a*), FIG. 2(*a*) shows a flow chart of a first embodiment of a method for generating an image according to the present disclosure, and the method includes the steps of S201 to S203.

Step S201 includes acquiring a screenshot of a webpage preloaded by a terminal as a source image.

In this embodiment, an object extracted by an execution body is a material included in a webpage presented by a terminal, and the material includes a text material and a picture material. A source image includes not only the materials in the webpage, but also a spatial relationship between the materials.

As an example, the source image may be generated by the following way: the execution body acquires a webpage network address preloaded on the terminal, and the webpage obtained by accessing the network address is the webpage preloaded on the terminal, and then the execution body takes a screenshot of the obtained webpage and uses the obtained screenshot as the source image. For example, the execution body may execute the above steps through the snapshot tool, or may directly receive a screenshot of the webpage sent by a terminal device through a network, which is not limited herein.

Step S202 includes recognizing connection areas in the source image, and generating first circumscribed rectangular frames outside outlines of the connection areas.

A connection area, also known as a connected area, refers to an image area composed of foreground pixels having a given pixel value and adjacent positions in the image. Each of connection areas in the image may be recognized by a connection area analysis, and a first circumscribed rectangular frame is generated outside the outline of the connection area. The connection area analysis is a conventional technical means in the field of image processing. This function may be implemented through such as the Two-Pass method or the OCR algorithm (Optical Character Recognition), which is not limited herein.

In this embodiment, the first circumscribed rectangular frame is used to label a minimum connection area in the source image. For example, the execution body (such as the terminal shown in FIG. 1) may recognize the connection area in the source image through the OCR algorithm. If there is a text segment in the source image, an area of each text line in the image is recognized as the connection area, and correspondingly, the first circumscribed rectangular frame is generated outside the outline of the area of each text line, so that the execution body may recognize multiple domains from an image of the text segment and generate multiple first circumscribed rectangular frames.

It should be noted that a recognition precision of the minimum connection area may be adjusted according to actual requirements. For example in the above example, a given paragraph of text may alternatively be recognized as a connection area, and correspondingly, a first circumscribed rectangular frame may be generated outside an outline of an area of the paragraph of the text in the source image, which is not limited herein.

Step S203 includes combining, if a distance between the connection areas is smaller than a preset distance threshold, the connection areas, and generating a second circumscribed rectangular frame outside outlines of the combined connection areas.

In this embodiment, the second circumscribed rectangular frame is used to represent a circumscribed rectangular frame having a nested relationship. Through combining the connection areas, a second circumscribed rectangular frame having a multilayer nested relationship may be obtained. A distance between the connection areas is used to represent a spatial relationship between materials included in different connection areas in the source image.

Figure 2B:
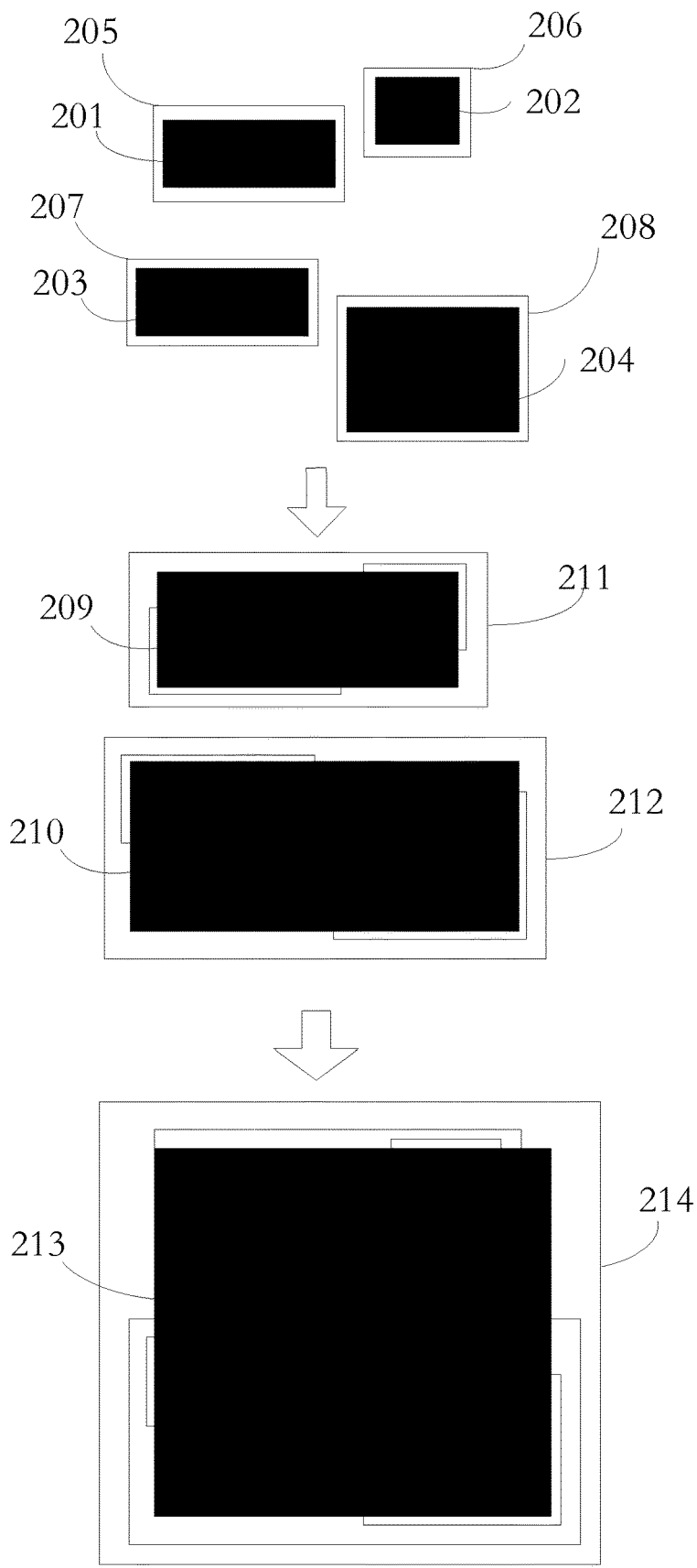

Further referring to FIG. 2(*b*), FIG. 2(*b*) shows a specific example of this embodiment. Connection areas 1, 2, 3 and 4 (201, 202, 203 and 204 as shown in FIG. 2(*b*)) correspond to first circumscribed rectangular frames a, b, c and d (205, 206, 207 and 208 as shown in FIG. 2(*b*)), respectively. The execution body executes the step S203, combines the connection areas 1 and 2 to obtain a connection area 5 (209 as shown in FIG. 2(*b*)), and combines the connection areas 3 and 4 to obtain a connection area 6 (210 as shown in FIG. 2(*b*)); a second circumscribed rectangular frame e (211 as shown in FIG. 2(*b*)) is generated outside the outline of the connection area 5, and a second circumscribed rectangular frame f (212 as shown in FIG. 2(*b*)) is generated outside the outline of the connection area 6; then, if a distance between the connection area 5 and the connection area 6 is still smaller than a preset distance threshold, the execution body continues to combine the connection area 5 and the connection area 6 to obtain a connection area 7 (213 as shown in FIG. 2(b)), and generates a second circumscribed rectangular frame g (214 as shown in FIG. 2(b)) outside the outline of the connection area 7. Finally, the second circumscribed rectangular frames e, f and g are obtained. The second circumscribed rectangular frame g includes the second circumscribed rectangular frame f, and the second circumscribed rectangular frame e includes the first circumscribed rectangular frames a and b, and the second circumscribed rectangular frame f includes the first circumscribed rectangular frames c and d. The inclusion relationships between the circumscribed rectangular frames are the nested relationships between the first external rectangular frames and the second external rectangular frames, and may be used to represent a spatial relationship between materials in the connection areas.

Step S204 includes generating a target image, based on a nested relationship between the first circumscribed rectangular frames and the second circumscribed rectangular frame and pictures in the first circumscribed rectangular frame.

In this embodiment, a picture in a first circumscribed rectangular frame represents a material to be extracted from the source image, and is a basis element for generating a target image. A nested relationship between the first external rectangular frames and the second external rectangular frame is used to represent a spatial relationship between materials in the source image.

The execution body combines pictures in the first circumscribed rectangular frames to obtain the target image according to the nested relationship obtained in the step S203.

In a specific example, the target image may be generated by the following way: the execution body may use a rect function to represent the first circumscribed rectangular frames and the second circumscribed rectangular frame, and each rect stores a coordinate of the upper left corner of a circumscribed rectangular frame in the source image and the length and width of the circumscribed rectangular frame. In this case, each rect represents a first circumscribed rectangular frame or a second circumscribed rectangular frame. Then, the execution body takes the rect including the largest number of rect as the parent node, and constructs a rect tree structure according to the nested relationship between the first circumscribed rectangular frames and the second circumscribed rectangular frame. Each node in the tree structure represents a first circumscribed rectangular frame or a second circumscribed rectangular frame, and the bottom node represents a first circumscribed rectangular frame in the source image. Finally, the execution body combines the pictures in the first circumscribed rectangular frames to obtain the target image according to the tree structure.

Figure 3:
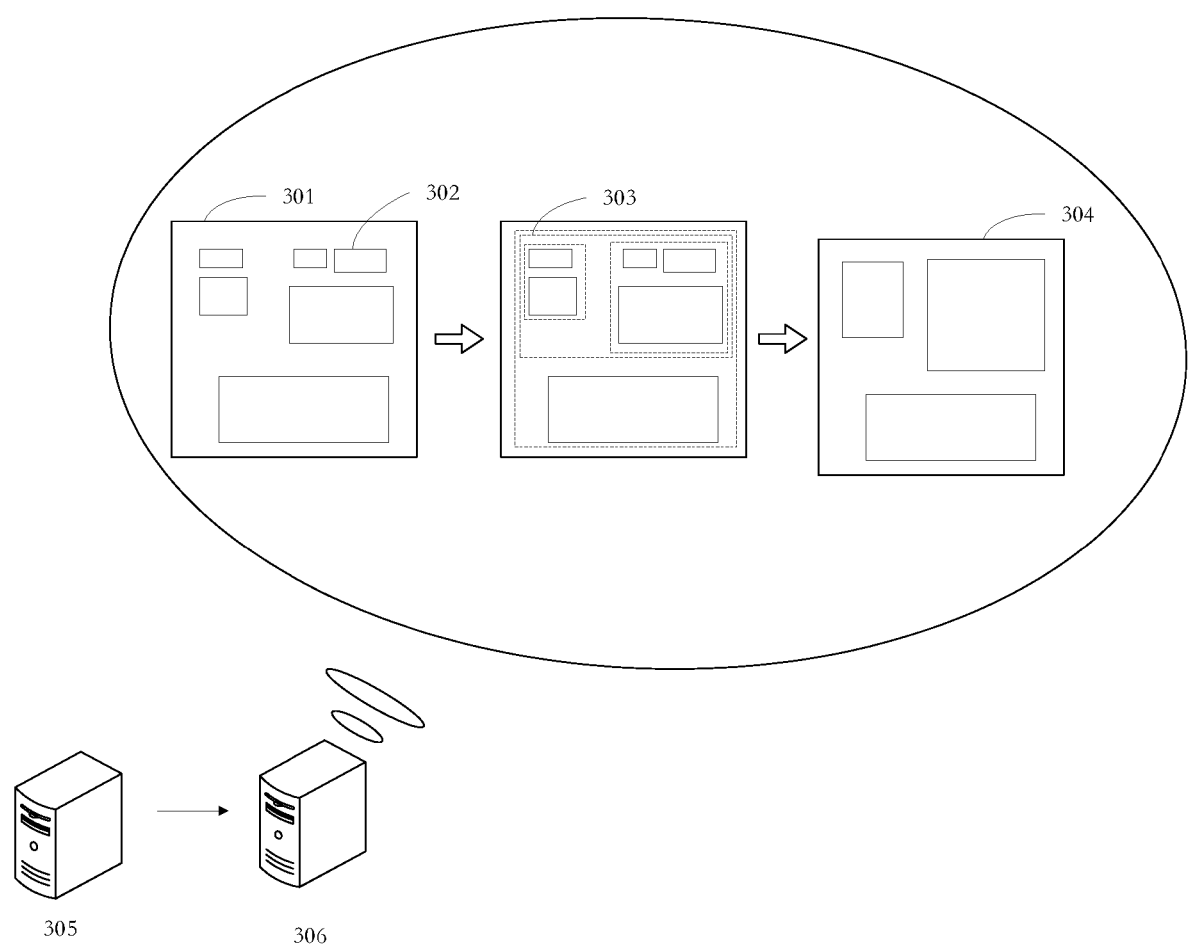
FIG. 3 is a schematic diagram of an application scenario of the method for generating the image according to an embodiment of the present disclosure.

Further referring to FIG. 3, FIG. 3 shows a schematic diagram of an application scenario of the method for generating the image according to the present disclosure. In the application scenario, an execution body 306 may be a terminal device or a server. The execution body acquires a screenshot 301 of a webpage preloaded on a terminal 305 through a network, recognizes connection areas therein and obtains first detection frames (302 as shown in FIG. 3), then combines connection areas between which distances are smaller than a present distance threshold, and obtains second detection frames (303 as shown in FIG. 3), finally combines pictures in the first detection frames to obtain a target image 304 based on nested relationships between the first detection frames and the second detection frames.

According to the method for generating the image of the above embodiments provided by the present disclosure, the first circumscribed rectangular frame and the second circumscribed rectangular frame are respectively generated by recognizing and combining the connection areas in the source image, and the spatial relationship between the materials in the webpage is represented by the nested relationship between the first circumscribed rectangular frame and the second circumscribed rectangular frame, so that the spatial relationship between materials in the source image may be reflected in the generated target image.

Figure 4:
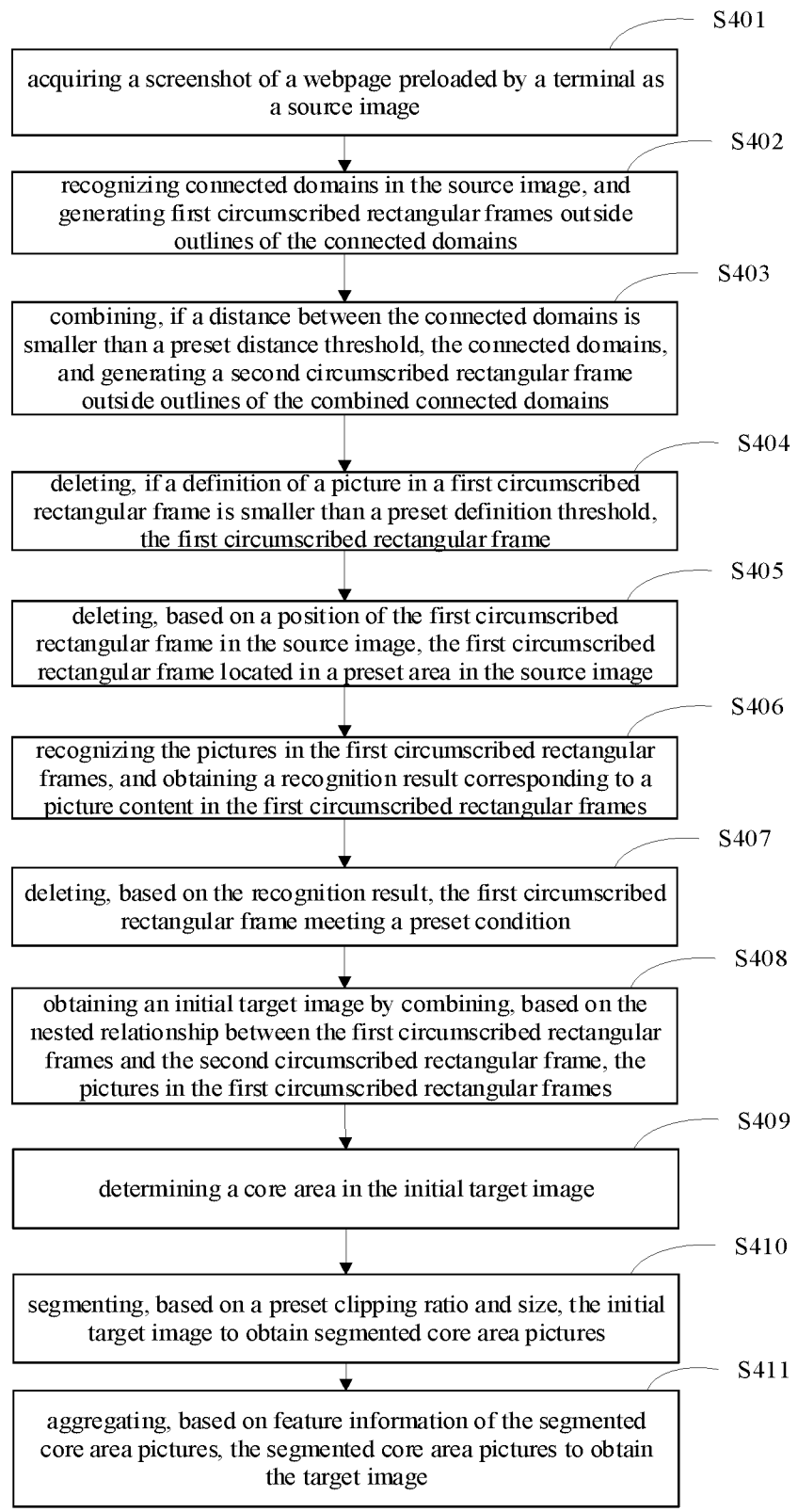
FIG. 4 is a schematic diagram of a second embodiment of the method for generating the image according to an embodiment of the present disclosure.

Further referring to FIG. 4, FIG. 4 shows a flow chart of a second embodiment of the method for generating the image according to the present disclosure, and the method includes the steps of S401 to S411.

Step S401 includes acquiring a screenshot of a webpage preloaded by a terminal as a source image. This step corresponds to the step S201, and details are not described herein.

Step S402 includes recognizing connection areas in the source image, and generating a first circumscribed rectangular frame outside outlines of the connection areas. This step corresponds to the step S202, and details are not described herein.

Step S403 includes combining, if a distance between the connection areas is smaller than a preset distance threshold, the connection areas, and generating a second circumscribed rectangular frame outside outlines of the combined connection areas. This step corresponds to the step S203, and details are not described herein.

Step S404 includes deleting, if a definition of a picture in a first circumscribed rectangular frame is smaller than a preset definition threshold, the first circumscribed rectangular frame. In this case, extracting a low-definition material may be avoided, thereby ensuring the quality of the generated target image.

Step S405 includes deleting, based on a position of the first circumscribed rectangular frame in the source image, the first circumscribed rectangular frame located in a preset area in the source image.

In this embodiment, the preset area represents an area in which a less important material in the source image is located, and for example, may be a bottom area and a top area of the source image. Generally, for a webpage, a less importance text or picture (for example, an advertisement placed in the webpage) may be placed in these two areas. The first circumscribed rectangular frame is used to label the position and area of a material to be extracted in the source image, so that the execution body extracts the image in the area from the source image, that is, the step of extracting the material from the source image is completed. Therefore, deleting the first circumscribed rectangular frame means that the image in the first circumscribed rectangular frame is not extracted.

The execution body deletes the first circumscribed rectangular frame located in the preset area, and filters out a low-value material, thereby helping to reduce the calculation amount and avoiding the generated target image including the low-value material.

Step S406 includes recognizing the pictures in the first circumscribed rectangular frames, and obtaining a recognition result corresponding to a picture content in the first circumscribed rectangular frames.

In this embodiment, the pictures in the first circumscribed rectangular frames include text material pictures and image material pictures, which may include a low-value material, for example, some of the text material pictures are advertisement slogans in a webpage, and some of the image material pictures are logo pictures or button pictures in the webpage, and the effective information included in these materials is little so that the value is low. By recognizing the pictures in the first circumscribed rectangular frames, recognition results corresponding to picture contents may be obtained, and the recognition results may be used to determine whether the picture in the first circumscribed rectangular frame needs to be filtered out. For example, the execution body may input the source image into the convolutional neural network model to obtain recognition results of pictures in first circumscribed rectangular frames in the source image. The recognition results may include various types such as a text, logo pictures, advertisement slogans or button pictures.

Step S407 includes deleting, based on the recognition result, a first circumscribed rectangular frame meeting a preset condition. The preset condition may be set according to actual requirements to remove unwanted materials and retain valuable materials.

In this embodiment, the material to be extracted includes a text material and an image material. For example, the preset condition may be set to a logo picture, a button picture and an advertisement slogan. If recognition results are the above three types, the execution body deletes the corresponding first circumscribed rectangular frame. In this case, when the target image is subsequently generated, the content of the picture area in the deleted frame is not included, so that the content extracted from the source image is filtered to avoid adding the low-value material into the generated target image.

In some alternative implementations of this embodiment, before deleting the first circumscribed rectangular frame meeting the preset condition, the method may further include: storing, based on the recognition result, a picture in the first circumscribed rectangular frame corresponding to the recognition result into a preset position. In a practical application scenario, although some pictures in the source image are not required for the target image, they may be used for other purposes, for example, a logo picture in the source image may be used for business data analysis of a webpage, a button picture may be used for analyzing an interactive function of the webpage and so on, so that the execution body may store the recognized logo picture and the button picture into corresponding storage locations, respectively, for subsequent applications.

Step S408 includes generating an initial target image by combining, based on nested relationships between first circumscribed rectangular frames and second circumscribed rectangular frames, pictures in the first circumscribed rectangular frames. This step is similar to the step of generating the target image in the step S204. The difference between step s408 and step s204 is that in this embodiment, the image is obtained by combining the pictures in the first circumscribed rectangular frames as the initial target image based on the nested relationships between the first circumscribed rectangular frames and the second circumscribed rectangular frames, and then the target image is obtained after subsequent processing.

Step S409 includes determining a core area in the initial target image, where the core area in the initial target image is an area including a preset target in the initial target image.

In this embodiment, a preset target is used to represent a material including key information in the initial target image, and the preset target includes at least one of an image including a human face or a dense text. As an example, the execution body may recognize the image including the human face and an area where the dense text is located from the initial target image by using a significance detection algorithm, i.e., the core areas of the initial target image. It should be noted that the number of core areas may be one or more, based on the number of areas of the human face image or areas of the dense text in the initial target image.

Step S410 includes segmenting, based on a preset clipping ratio and size, the initial target image to obtain segmented core area pictures.

In this embodiment, the execution body may preset a clipping ratio and size according to actual requirements, segment the initial target image into multiple segmented pictures with a given clipping ratio and size, and then delete the pictures outside the core area to obtain segmented core area pictures. For example, when the initial target image includes multiple areas of a human face image and multiple areas of a dense text, the execution body may obtain multiple core area pictures by segmenting the initial target image, while other pictures, which are not located in the core area, are deleted after segmenting.

Step S411 includes aggregating, based on feature information of the segmented core area pictures, the segmented core area pictures to obtain the target image, where the feature information includes at least one of a size, an aspect ratio or a composition attribute of the picture.

In this embodiment, the composition attribute of the picture includes text and image, for representing whether a material content included in the picture is a text or an image.

Based on feature information of the segmented core area pictures obtained in the step S410, the execution body may aggregate the segmented core area pictures to obtain the target image according to a preset rule. For example, segmented core area pictures, whose composition attributes are texts and sizes are the same, may be spliced together to aggregate the texts in two related areas into a whole text, thereby ensuring the continuity between text materials. For another example, segmented core area pictures, whose composition attributes are images and aspect ratios and sizes are the same, may be aggregated in one area to highlight the contrast and connection between multiple image materials.

As can be seen from FIG. 4, compared with the first embodiment shown in FIG. 2, the second embodiment shows a step of generating the initial target image and identifying the core area thereof according to the nested relationship, and then segmenting the initial target image and performing aggregation, and a step of filtering the material extracted from the source image according to the preset rule. By segmenting the initial target image and performing aggregation, the important material may be further extracted from the initial target image, and the material extracted from the source image is filtered according to the preset rule, so that the low-value material in the source image may be removed, thereby avoiding the target image including the low-value material, thereby improving the quality of the material included in the generated target image.

Figure 5:
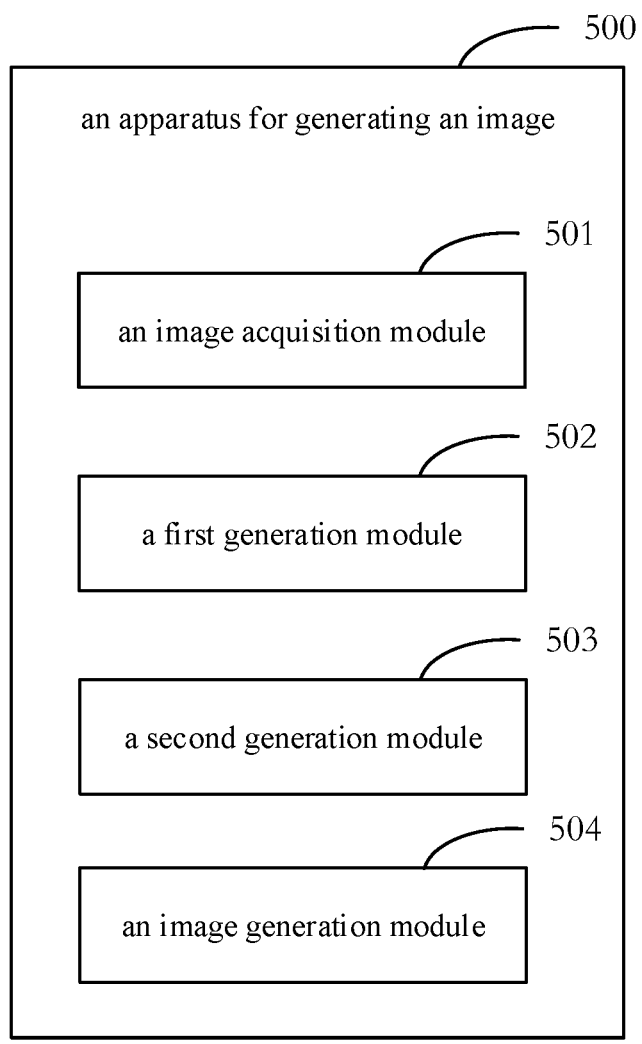
FIG. 5 is a block diagram of an electronic device for implementing the method for generating the image according to an embodiment of the present disclosure.

FIG. 5 shows a block diagram of an apparatus 500 of the method for generating the image according to the present disclosure, and the apparatus includes: an image acquisition module 501, configured to acquire a screenshot of a webpage preloaded by a terminal as a source image; a first generation module 502, configured to recognize connection areas in the source image, and generate first circumscribed rectangular frames outside outlines of the connection areas; a second generation module 503, configured to combine, if a distance between the connection areas is smaller than a preset distance threshold, the connection areas, and generate a second circumscribed rectangular frame outside outlines of the combined connection areas; and an image generation module 504, configured to generate a target image, based on a nested relationship between the first circumscribed rectangular frames and the second circumscribed rectangular frame and pictures in the first circumscribed rectangular frames In this embodiment, the image generation module 504 includes: an initial image module, configured to combine, based on a nested relationship between first circumscribed rectangular frames and the second circumscribed rectangular frame, pictures in the first circumscribed rectangular frames into an initial target image; an area recognition module, configured to determine a core area in the initial target image, where the core area in the initial target image is an area including a preset target in the initial target image; an image segmentation module, configured to segment, based on a preset clipping ratio and size, the initial target image to obtain segmented core area pictures; and a picture aggregation module, configured to aggregate, based on feature information of the segmented core area pictures, the segmented core area pictures to obtain the target image, where the feature information includes at least one of a size, an aspect ratio or a composition attribute of the pictures.

In this embodiment, the apparatus further includes a picture recognition module, configured, before determining the picture core area within the first circumscribed rectangular frames, to execute: recognizing the pictures in the first circumscribed rectangular frames, and obtaining a recognition result corresponding to a picture content in the first circumscribed rectangular frames; and deleting, based on the recognition result, a first circumscribed rectangular frame meeting a preset condition.

In this embodiment, the picture recognition module is further configured to store, based on the recognition result, the picture in the first circumscribed rectangular frame corresponding to the recognition result into a preset position, before deleting the first circumscribed rectangular frame meeting the preset condition.

In this embodiment, the apparatus further includes a position detection module, configured to delete, based on a position of a first circumscribed rectangular frame in the source image, the first circumscribed rectangular frame located in a preset area in the source image, before determining the picture core area within the first circumscribed rectangular frames.

In this embodiment, the apparatus further includes a definition detection module, configured to delete, if a definition of a picture in a first circumscribed rectangular frame is smaller than a preset definition threshold, the first circumscribed rectangular frame, before generating the initial target image.

According to an embodiment of the present disclosure, the present disclosure provides an electronic device and a readable storage medium.

Figure 6:
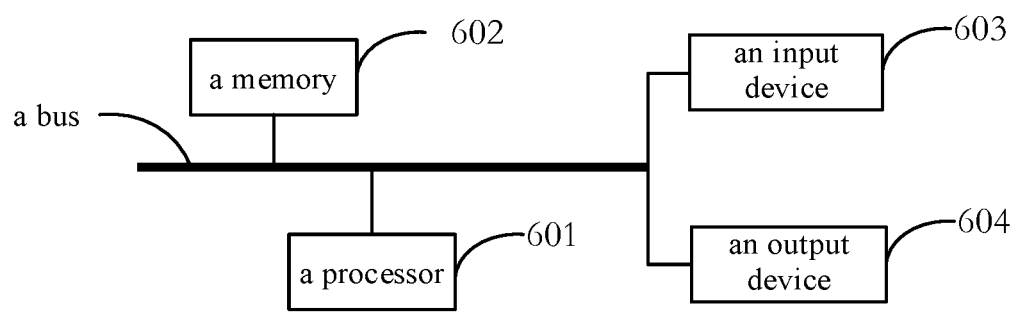
FIG. 6 is a scenario diagram of a computer storable medium in which an embodiment of the present disclosure may be implemented.

FIG. 6 shows a block diagram of an electronic device of a method for generating an image according to an embodiment of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile devices such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the electronic device includes one or more processors 601, a memory 602, and interfaces for connecting components, including a high speed interface and a low speed interface. The various components are interconnected by different buses and may be mounted on a common motherboard or otherwise as desired. The processor may process instructions executed within the electronic device, including instructions stored in or on a memory to display graphical information of the GUI on an external input/output device, such as a display device coupled to an interface. In other embodiments, multiple processors and/or multiple buses may be used with multiple memories, if desired. Similarly, a plurality of electronic devices may be connected, each providing a portion of the necessary operations (e.g., as a server array, a set of blade servers, or a multiprocessor system). An example of a processor 601 is shown in FIG. 6.

The memory 602 is a non-transitory computer readable storage medium provided by the present disclosure. The memory stores instructions executable by at least one processor to cause at least one processor to execute the method for generating an image provided by the present disclosure. The non-transitory computer readable storage medium of the present disclosure stores computer instructions for causing a computer to execute the method for generating an image provided by the present disclosure.

As a non-transitory computer readable storage medium, the memory 602 may be used to store non-transitory software programs, non-transitory computer executable programs and modules, such as the program instructions or modules corresponding to the method for generating an image in the embodiment of the present disclosure (such as the image acquisition module 501, the first generation module 502, the second generation module 502 and the image generation module 504 shown in FIG. 5). The processor 601 runs the non-transitory software programs, instructions and modules stored in the memory 602 to execute various functional applications and data processing of the server, thereby implementing the method for generating an image in the embodiment of the method.

The memory 602 may include a storage program area and a storage data area, where the storage program area may store an operating system and an application program required by at least one function; and the storage data area may store data created according to the use of the electronic device of the computer storable medium. In addition, the memory 602 may include a high-speed random access memory, and may further include a non-transitory memory, such as at least one magnetic disk storage device, a flash memory or other non-transitory solid state storage devices. In some embodiments, the memory 602 may alternatively include a memory disposed remotely relative to the processor 601, which may be connected through a network to the electronic device of the computer storable medium. Examples of such networks include, but are not limited to, the Internet, enterprise intranets, local area networks, mobile communication networks and combinations thereof.

The electronic device of the method for generating an image may further include an input device 603 and an output device 604. The processor 601, the memory 602, the input device 603 and the output device 604 may be interconnected through a bus or other means, and an example of a connection through a bus is shown in FIG. 6.

The input device 603 may receive input number or character information, and generate key signal input related to user settings and functional control of the electronic device of the method for generating an image, such as a touch screen, a keypad, a mouse, a track pad, a touch pad, a pointer bar, one or more mouse buttons, a trackball or a joystick. The output device 604 may include a display device, an auxiliary lighting device (such as an LED) and a tactile feedback device (such as a vibration motor) and the like. The display device may include, but is not limited to, a liquid crystal display (LCD), a light emitting diode (LED) display and a plasma display. In some embodiments, the display device may be a touch screen.

The various embodiments of the systems and techniques described herein may be implemented in digital electronic circuit systems, integrated circuit systems, specific ASICs (application specific integrated circuits), computer hardware, firmware, software, and/or combinations thereof. These various embodiments may include being implemented in one or more computer programs that may be executed and/or interpreted on a programmable system including at least one programmable processor. The at least one programmable processor may be a dedicated or general purpose programmable processor, may receive data and instructions from a memory system, at least one input device, and at least one output device, and transmit the data and instructions to the memory system, the at least one input device, and the at least one output device.

These computing programs (also referred to as programs, software, software applications, or code) include machine instructions of a programmable processor and may be implemented in high-level procedures and/or object-oriented programming languages, and/or assembly/machine languages. As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component, or front-end component. The components of the system may be interconnected by any form or medium of digital data communication (such as a communication network). Examples of communication networks include a local area network (LAN), a wide area network (WAN) and the Internet.

The computer system may include a client and a server. The client and the server are generally remote from each other and interact generally through a communication network. The relationship between the client and the server is generated by running the computer programs having a client-server relationship with each other on the corresponding computer.

According to the technical solution of the embodiment of the present disclosure, the first circumscribed rectangular frames and the second circumscribed rectangular frame are respectively generated by recognizing and combining the connection areas in the source image, and the spatial relationship between the materials in the webpage is represented by the nested relationship between the first circumscribed rectangular frames and the second circumscribed rectangular frame, so that the spatial relationship between materials in the source image may be reflected in the generated target image.

It should be appreciated that the steps of reordering, adding or deleting may be executed using the various forms shown above. For example, the steps described in the present disclosure may be executed in parallel or sequentially or in a different order, so long as the expected results of the technical solutions disclosed in the present disclosure may be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and modifications that fall within the spirit and principles of the disclosure are intended to be included within the scope of this disclosure.

What is claimed is:

1. A method for generating an image of webpage content, the method comprising:
   acquiring a screenshot of a webpage preloaded by a terminal as a source image;
   recognizing connection areas in the source image, and generating first circumscribed rectangular frames outside outlines of the connection areas;
   combining, in response determining that a distance between the connection areas is smaller than a preset distance threshold, the connection areas, and generating a second circumscribed rectangular frame outside outlines of the combined connection areas; and
   generating, based on a nested relationship between the first circumscribed rectangular frames and the second circumscribed rectangular frame and pictures in the first circumscribed rectangular frames, a target image, wherein the generating, based on a nested relationship between the first circumscribed rectangular frames and the second circumscribed rectangular frame and pictures in the first circumscribed rectangular frames, a target image comprises:
   obtaining an initial target image by combining, based on the nested relationship between the first circumscribed rectangular frames and the second circumscribed rectangular frame, the pictures in the first circumscribed rectangular frames;
   determining a core area in the initial target image, wherein the core area in the initial target image is an area comprising a preset target in the initial target image;

segmenting, based on a preset clipping ratio and size, the initial target image to obtain segmented core area pictures; and aggregating, based on feature information of the segmented core area pictures, the segmented core area pictures to obtain the target image, wherein the feature information comprises at least one of a size, an aspect ratio or a composition attribute of the pictures.

2. The method according to claim 1, wherein before generating the initial target image, the method further comprises:

recognizing the pictures in the first circumscribed rectangular frames, and obtaining a recognition result corresponding to picture content in the first circumscribed rectangular frames; and deleting, based on the recognition result, a first circumscribed rectangular frame meeting a preset condition.

3. The method according to claim 2, wherein before deleting the first circumscribed rectangular frame meeting the preset condition, the method further comprises:

storing, based on the recognition result, a picture in the first circumscribed rectangular frame corresponding to the recognition result into a preset position.

4. The method according to claim 2, wherein before generating the initial target image, the method further comprises:

deleting, based on a position of the first circumscribed rectangular frame in the source image, the first circumscribed rectangular frame located in a preset area in the source image.

5. The method according to claim 1, wherein before generating the initial target image, the method further comprises:

deleting a first circumscribed rectangular frame, in response to determining that a definition of a picture in the first circumscribed rectangular frame is smaller than a preset definition threshold.

6. An electronic device, comprising:
at least one processor; and
a memory communicating with the at least one processor, wherein the memory stores instructions executable by the at least one processor, and the instructions, when executed by the at least one processor, cause the at least one processor to perform operations comprising:
acquiring a screenshot of a webpage preloaded by a terminal as a source image;
recognizing connection areas in the source image, and generating first circumscribed rectangular frames outside outlines of the connection areas;
combining, in response determining that a distance between the connection areas is smaller than a preset distance threshold, the connection areas, and generating a second circumscribed rectangular frame outside outlines of the combined connection areas; and
generating, based on a nested relationship between the first circumscribed rectangular frames and the second circumscribed rectangular frame and pictures in the first circumscribed rectangular frames, a target image, wherein the generating, based on a nested relationship between the first circumscribed rectangular frames and the second circumscribed rectangular frame and pictures in the first circumscribed rectangular frames, a target image comprises:
obtaining an initial target image by combining, based on the nested relationship between the first circumscribed rectangular frames and the second circumscribed rectangular frame, the pictures in the first circumscribed rectangular frames;

determining a core area in the initial target image, wherein the core area in the initial target image is an area comprising a preset target in the initial target image;

segmenting, based on a preset clipping ratio and size, the initial target image to obtain segmented core area pictures; and aggregating, based on feature information of the segmented core area pictures, the segmented core area pictures to obtain the target image, wherein the feature information comprises at least one of a size, an aspect ratio or a composition attribute of the pictures.

7. The electronic device according to claim 6, wherein before generating the initial target image, the operations further comprise:

recognizing the pictures in the first circumscribed rectangular frames, and obtaining a recognition result corresponding to picture content in the first circumscribed rectangular frames; and deleting, based on the recognition result, a first circumscribed rectangular frame meeting a preset condition.

8. The electronic device according to claim 7, wherein before deleting the first circumscribed rectangular frame meeting the preset condition, the operations further comprise:

storing, based on the recognition result, a picture in the first circumscribed rectangular frame corresponding to the recognition result into a preset position.

9. The electronic device according to claim 7, wherein before generating the initial target image, the operations further comprise:

deleting, based on a position of the first circumscribed rectangular frame in the source image, the first circumscribed rectangular frame located in a preset area in the source image.

10. The electronic device according to claim 6, wherein before generating the initial target image, the operations further comprise:

deleting a first circumscribed rectangular frame, in response to determining that a definition of a picture in the first circumscribed rectangular frame is smaller than a preset definition threshold.

11. A non-transitory computer readable storage medium storing computer instructions, wherein the computer instructions cause a computer to perform operations comprising:

acquiring a screenshot of a webpage preloaded by a terminal as a source image;

recognizing connection areas in the source image, and generating first circumscribed rectangular frames outside outlines of the connection areas;

combining, in response determining that a distance between the connection areas is smaller than a preset distance threshold, the connection areas, and generating a second circumscribed rectangular frame outside outlines of the combined connection areas; and generating, based on a nested relationship between the first circumscribed rectangular frames and the second circumscribed rectangular frame and pictures in the first circumscribed rectangular frames, a target image, wherein the generating, based on a nested relationship between the first circumscribed rectangular frames and the second circumscribed rectangular frame and pictures in the first circumscribed rectangular frames, a target image comprises:

obtaining an initial target image by combining, based on the nested relationship between the first circumscribed rectangular frames and the second circumscribed rectangular frame, the pictures in the first circumscribed rectangular frames;

determining a core area in the initial target image, wherein the core area in the initial target image is an area comprising a preset target in the initial target image;

segmenting, based on a preset clipping ratio and size, the initial target image to obtain segmented core area pictures; and aggregating, based on feature information of the segmented core area pictures, the segmented core area pictures to obtain the target image, wherein the feature information comprises at least one of a size, an aspect ratio or a composition attribute of the pictures.

12. The computer readable storage medium according to claim 11, wherein before generating the initial target image, the operations further comprise:

recognizing the pictures in the first circumscribed rectangular frames, and obtaining a recognition result corresponding to picture content in the first circumscribed rectangular frames; and deleting, based on the recognition result, a first circumscribed rectangular frame meeting a preset condition.

13. The computer readable storage medium according to claim 12, wherein before deleting the first circumscribed rectangular frame meeting the preset condition, the operations further comprise:

storing, based on the recognition result, a picture in the first circumscribed rectangular frame corresponding to the recognition result into a preset position.

14. The computer readable storage medium according to claim 12, wherein before generating the initial target image, the operations further comprise:

deleting, based on a position of the first circumscribed rectangular frame in the source image, the first circumscribed rectangular frame located in a preset area in the source image.

15. The computer readable storage medium according to claim 11, wherein before generating the initial target image, the operations further comprise:

deleting a first circumscribed rectangular frame, in response to determining that a definition of a picture in the first circumscribed rectangular frame is smaller than a preset definition threshold.

* * * * *